United States Patent [19]

Corompt

[11] 4,132,325
[45] Jan. 2, 1979

[54] LOADING MECHANISM FOR A MULTIPLE USE CONTAINER

[76] Inventor: Antoine Corompt, LaMetare-Rue Rembrandt, Saint Etienne (Loire), France

[21] Appl. No.: 816,507

[22] Filed: Jul. 13, 1977

[30] Foreign Application Priority Data

Jul. 13, 1976 [FR] France ................................ 7622027

[51] Int. Cl.² ............................................... B60P 1/64
[52] U.S. Cl. ................................. 214/515; 214/77 R; 280/43.24
[58] Field of Search ............................ 214/77 R, 515; 280/43.24

[56] References Cited

U.S. PATENT DOCUMENTS 3,942,664  3/1976  Lemaire ......................... 214/77 R X
3,984,013  10/1976  Wirz ................................ 214/575 X Primary Examiner—Robert G. Sheridan
Attorney, Agent, or Firm—Remy J. VanOphem

[57] ABSTRACT

The invention is a loading mechanism intended to be used with a parallelepiped container conforming to the Rules of the International "ISO" standard. The loading mechanism is mounted to a lorry and actuated by a hydraulic actuator to load and unload the container from the lorry. The container itself is provided with a means for storing the handling arm and framework while the container is confined to the lorry. Manually operated retractable running wheels are further provided to assist in loading and unloading of the container.

10 Claims, 8 Drawing Figures

LOADING MECHANISM FOR A MULTIPLE USE CONTAINER

BACKGROUND OF THE INVENTION

The present invention relates to conventional containers such as for use with refuse, adapted to be handled by vehicles provided with handling arms.

These containers are constructed in accordance with the international standard known as "ISO" in the shape of rectangular parallelepipeds with fixed overall dimensions. Each container is fortified by strengthening bars which give a certain rigidity and has eight attachment points called "corner fittings" at its corners.

Due to the standardization of exterior dimensions, these containers can be placed on the platforms of lorries so as to comply with limits imposed on road height and width. To handle these containers, a crane is usually employed to lift the container by slings anchored to the corner fittings, or alternatively an unloading apparatus or arrangement which lifts th container by its base is used.

Also known are lorries provided with a handling device comprising a collapsible hydraulic arm mounted on a framework which is itself mounted to the chassis of the vehicle. The handling arm tips to the front or rear to handle movable containers which have, on their front face, a lifting bow which engages a hook integral with the free end of the hydraulic arm.

It is not possible to use the aforesaid device to handle standard ISO containers because even if it were possible to add to their front a lifting bow of suitable form, it would be necessary to make the base of the container rest on the lower arm of the handling device in a collapsed position and not directly on the chassis of the lorry. The container would then be too high from the ground and the standard road height would be exceeded.

SUMMARY OF THE INVENTION

It is therefore, an object of the present invention to provide a container which can be handled with the help of a lorry equipped with a collapsible tipping handling arm assembly and which at the same time, conforms to the ISO standard.

Accordingly, the present invention employs a parallelepipedal container conforming to the rules of "ISO" and adapted to be handled with the help of a lorry provided with a collapsible handling arm assembly. The handling arm assembly is mounted to a framework which is itself mounted to the chassis of the lorry. The free end of the arm carries a hook which is adapted to engage a lifting means integral with the front transverse wall of the load to be handled. The container has two sunken housings. The first housing is sunken into the front face of the container to receive the upper arm of the handling arm assembly and the second housing is sunken into the bottom of the container to receive the lower arm of the handling arm assembly when the container is placed on the lorry. Each housing extends in a substantially symmetrical fashion on either side of a longitudinal vertical medial plane of the container.

Preferably, the first housing extends substantially the height of the front face to form a tunnel and contains a lifting means adapted to cooperate with the hook of the handling arm.

Preferably also, the second housing extends along a part of the length of the lower face to form a tunnel from the front edge of the lower face of the container.

Preferably also, the container has two lateral rolling wheels concealed at the rear, each wheel being rotatably mounted around a transverse axle with respect to the container.

Preferably also, each rolling wheel is mounted to rotate freely on the rear end of a support centrally mounted to the container on a transverse axis of the container, the front end of the support being provided with a counterweight, and a spindle integral with a hand grip is capable of being threaded through holes provided in the container parallel to the axis of articulation of the support so that the support can be locked in either a retracted position when the front portion of the support passes above the spindle, or a lowered position when the spindle is threaded through a hole provided in the front portion of the support.

The present invention will now be described, by way of example, with reference to the accompanying drawings in which:

DETAILED DESCRIPTION OF THE PREFERRED EMBODIMENT

Figure 1:
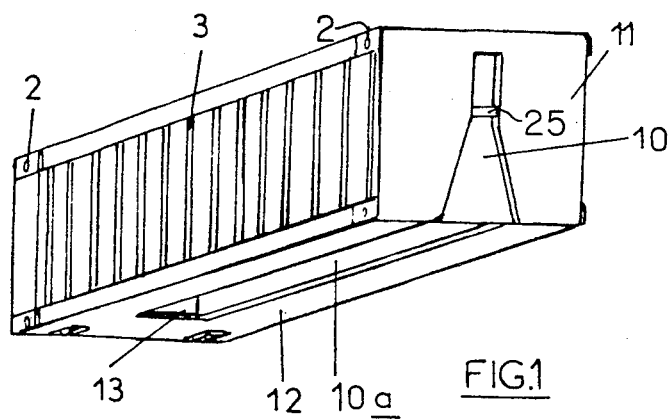
FIG. 1 is a perspective view of a container according to the invention.

Shown in FIG. 1 is a container, according to the invention, which conforms to the rules of the international standard known as "ISO" in that it is constituted by a parrellelepipedal box of standard overall dimension. It can thus be loaded onto the platform of any lorry without the lorry and/or container assembly exceeding the standard road gauge. It comprises, moreover, corner pieces 2 called "corner fittings", and solid reinforcing side bars 3 in order to constitute a container of known form.

However, this container is specially provided with means enabling it to be handled with the help of a lorry provided on its bed with a tipping handle arm assembly 4 (FIGS. 5 and 6) which comprises an upper arm 5 and a lower arm 6. The free end of the upper arm 5 is integral with a hook 7 and the base of the lower arm 6 is mounted on the free end of a framework 8 which is itself mounted onto the rear portion of the chassis of the lorry. The lower arm 6, extendable, by a first longitudinal ram or hydraulic jack located within and parallel to the arm 6. The two sections of lower arm 6 telescope at point 30. A second ram or jack 9 is attached from the arm 6 to the front of the chassis of the lorry to enable the handling arm assembly 4 to tip to the rear. Operation of the first longitudinal jack within extendable lower arm 6 is the first step in unloading and the last step in loading for movement of the container longitudinally along the lorry from and to the truck cap, respectively.

In one embodiment of the invention, the container comprises a first housing 10 sunken into the front traverse wall 11 to receive the upper arm 5, and a second housing 10a sunken into the bottom transverse wall 12 to receive the lower arm 6.

Each of these housings 10 and 10a extends in an approximately symmetrical fashion along the longitudinal medial plane of the container in order to form a tunnel. The housing 10, which widens towards the base of the container, extends substantially the height of the wall 11. A bar 25 is fixed across the housing 10 to receive the lifting hook 7. The housing 10a extends back only a specified distance from the front edge of the bottom wall 12 cooperation is achieved between a hooking portion 13 at the rearmost portion of tunnel 10a and a hook 14 mounted on the framwework 8. The two housings or tunnels 10 and 10a are mutually perpendicular and merge together at the lower front edge of the container.

Figure 7:
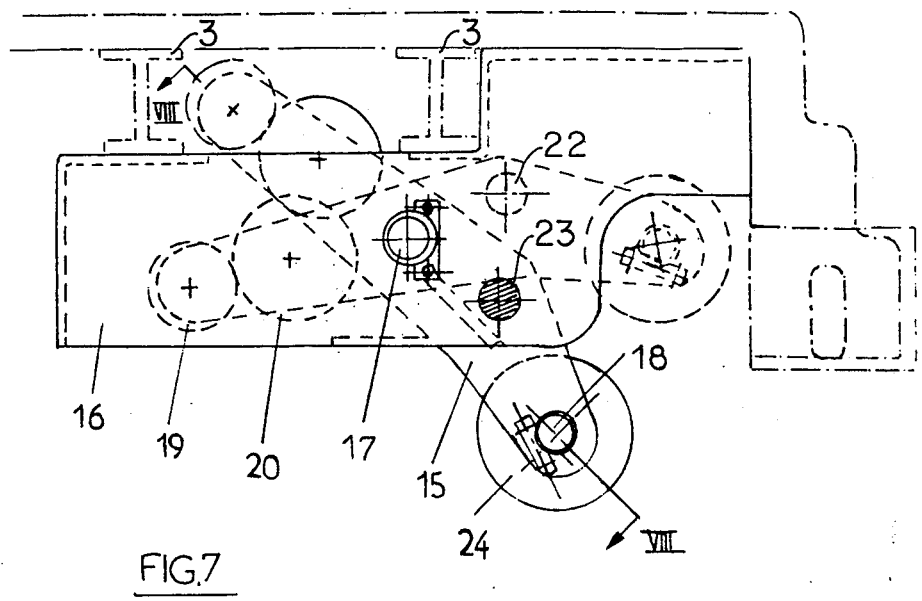
FIG. 7 is a vertical sectional view showing the mounting of a running wheel on the left side of the container with respect to the forward direction of travel of the container when mounted on the lorry.
Figure 8:
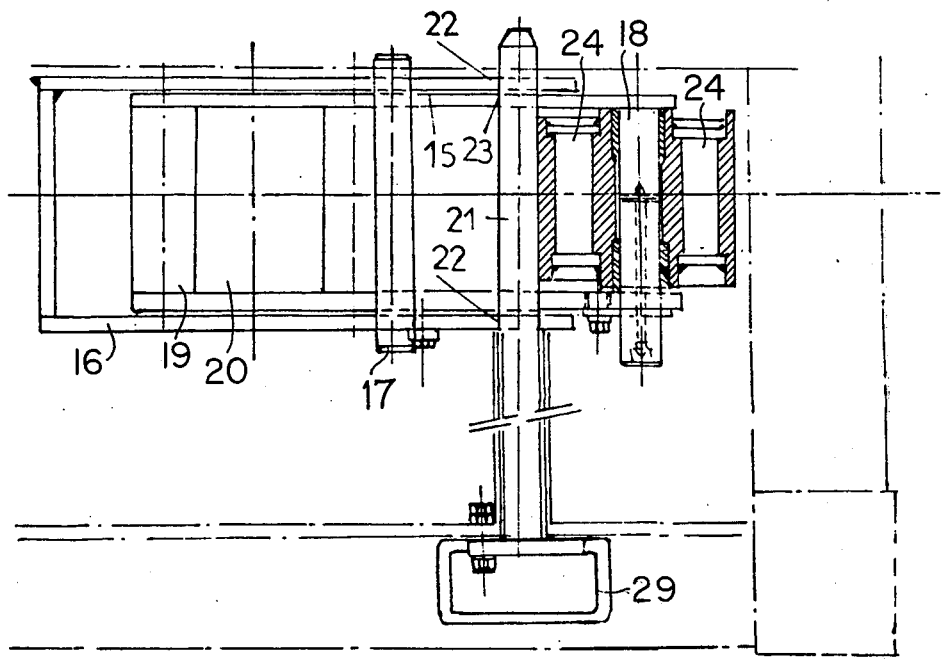
FIG. 8 is a section along line VIII—VIII in FIG. 7.

FIGS. 7 and 8 show the U.S. driver's side rear corner of the container. The container is there provided with a lower lateral running wheel 24 which is manually retractable with handle 29 behind concealing means in the bottom wall 12 of the container. The wheel is rotatably mounted on a support 15 as shown in FIGS. 7 and 8. Each support 15 is located in the interior of a reinforcing casing 16 provided in the lower corner of the bottom wall 12 and is itself rotatably mounted on a pivot 17 integral with the reinforcing casing 16. The wheel 24 turns around an axle 18 integral with the front tip of the support 15, and the rear tip of this support 15 is provided with two cylindrical counterweights 19 and 20. A spindle 21, capable of being threaded through holes 22 in the vertical walls of the reinforcing casing 16, is integral with a hand grip 29 at its tip, which grip extends outside the container. A hole 23 in the support 15 can also be traversed by the spindle 21. When the spindle 21 passes through this hole 23, the wheel 24 is extended below the lower level of the wall 12, whereas one can lock the wheel in a concealed retracted position by causing the support 15 to tip upwards around the pivot 17 and engaging the spindle 21 in the holes 22 in abutment with the support 15.

OPERATION

Figure 2:
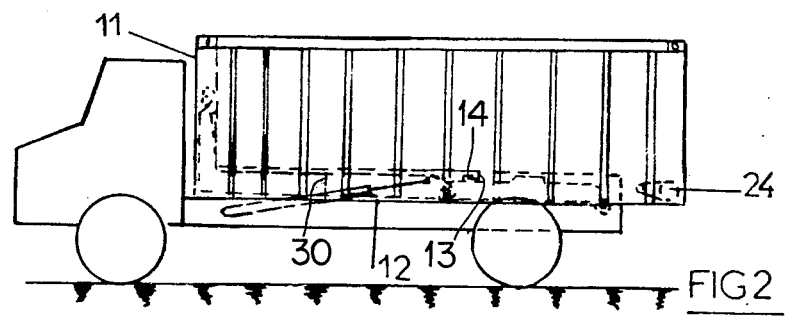
FIGS. 2 to 6 are side views each showing a different phase in the unloading of the container off a lorry provided with a collapsible handling arm.
Figure 3:
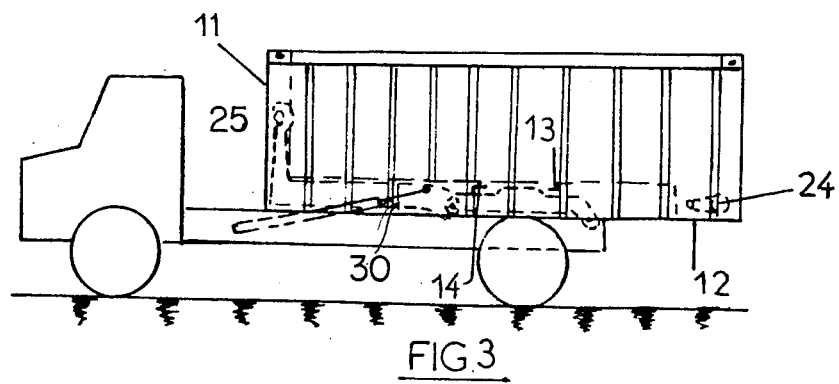
Figure 4:
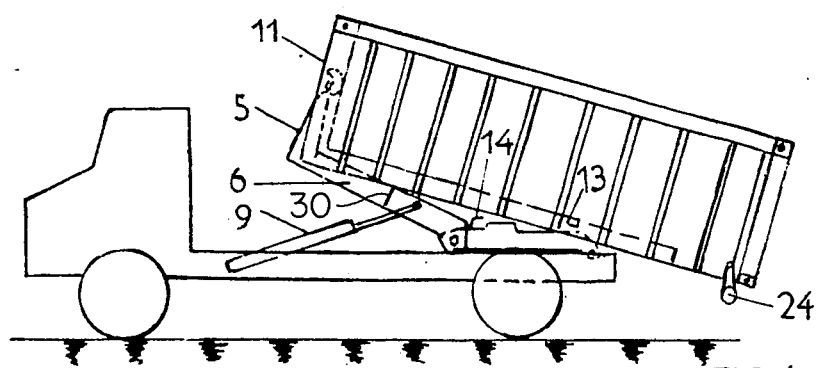
Figure 5:
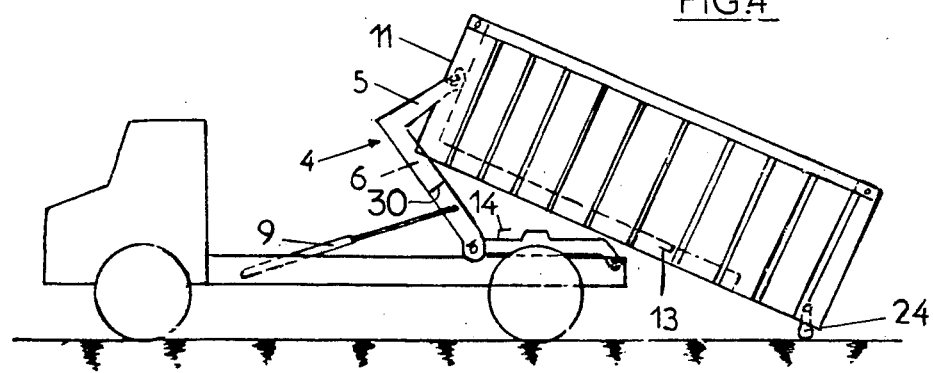
Figure 6:
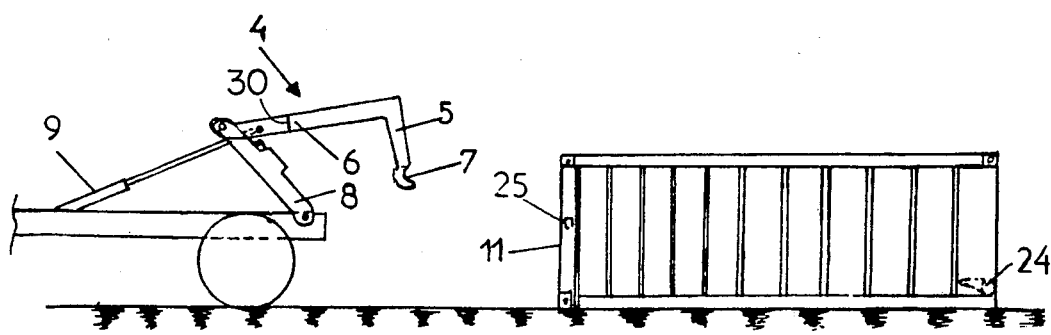

Referring to FIGS. 2 through 6, the operation of the invention is as follows. Beginning from a loaded position, the unloading is affected by firstly retracting the lower arm 6 with the longitudinal ram or jack located within the lower arm 6 of the handling arm assembly 4, as illustrated by FIGS. 2 and 3. The hook 13 disengages from the hook 14 while the container slides towards the rear. After the two supports 15 have been manually locked in an outwards operating position, ram 9 is then employed to swing the handling arm assembly 4 towards the rear as shown in FIGS. 4 and 5.

The mechanical arrangement of arm 6, framework 8, and ram 9 are such that framework 8 steadily begins to raise after the force applied by ram 9 at a point on arm 6 is overhead the point of attachment between arm 6 and framework 8. This allows complete unloading of the container from the lorry as in FIG. 6.

To load the container, the operation is carrier out in reverse and the upper and lower arms 5 and 6 of the handling arm assembly 4 respectively are concealed in the housings 10 and 10a of the container when the container is placed on the lorry.

The container can be handled in a known manner, that is, with the help of a crane and slings anchored to the corner pieces 2, or with the help of an unloading arrangement which lifts from below.

Finally one can employ the concealed wheels 24, in the position shown in solid lines in FIG. 7, when one wishes to roll the container into an emptying area. This area can comprise an area on the ground, or the platform of a trailer positioned behind the lorry. In this latter case, it can be seen that the present invention provides for the positioning of the container on the trailer where it can roll on the rear wheels 24, while the front of the container is suspended by the hook 7.

Having described my invention, the above example is not intended to limit the scope of the invention. It will become apparent to those in the art to modify the invention without departing from the spirit thereof.

What is claimed is:

1. A loading mechanism for loading a multiple use container on a lorry and chassis, said cntainer housing being parellelepiped and conforming to the rules of the international standard known as "ISO", said loading mechanism comprising:

a moveable framework having one end and an opposite end hingedly articulated to the chassis of the lorry;

a collapsible handling arm having an upper portion and a lower portion, said lower portion having one end slidably and hingedly mounted to said moveable framework, said upper portion having one end terminating in engaging means;

first means for actuating said handling arm, said first actuating means having one end hingedly attached to said lower portion of said handling arm and an opposite end hingedly mounted to said lorry;

second means for actuating said handling arm, said second actuating means mounted to said framework and said lower arm such that when said container is loaded upon said lorry said second actuating means moves said container along said lorry betwen a first and a second position;

said container housing having a tunnel housing juxtaposed said handling arm and said framework such that when said container is placed on said lorry said handling arm and said framework are positioned within said tunnel housing; and means for interlocking said container with said lorry, said interlocking means positioned on said framework and said housing tunnel to lock said container to said lorry during transport of said container.

2. The loading mechanism as claimed in claim 1, wherein said tunnel housing of said container extends the height of the front face to form a tunnel and further comprising a means for lifting mounted within said tunnel.

3. The loading mechanism as claimed in claim 2, wherein said lifting means comprises a transverse rod mounted in said tunnel housing.

4. The loading mechanism as claimed in claim 2, wherein said tunnel housing of said container extends along a part of the length of said container bottom to form a tunnel.

5. The loading mechanism as claimed in claim 4, wherein the tunnel housings merge together at right angles in the base region of the container.

6. The loading mechanism as claimed in claim 4, wherein said container further comprises two lateral rolling wheels concealed at the rear, each wheel being rotatably mounted around a transverse axle with respect to the container.

7. The loading mechanism as claimed in claim 6, wherein each rolling wheel is mounted to rotate freely on the rear end of a support centrally articulated to the container on a transverse axis of the container, the front end of the support being provided with a counterweight, and a spindle integral with a hand grip is capable of being threaded through holes provided in the container parallel to the axis of articulation of the support, so that the support can be locked in either a retracted position when the front portion of the support passes above the spindle, or a lowered position when the spindle is threaded through a hole provided in the front portion of the support.

8. The loading mechanism as claimed in claim 1, wherein said container further comprises two lateral rolling wheels concealed at the rear, each wheel being rotatably mounted around a transverse axle with respect to the container.

9. The loading mechanism as claimed in claim 8, wherein each rolling wheel is mounted to rotate freely on the rear end of a support centrally articulated to the container on a transverse axis of the container, the front end of the support being provided with a counterweight, and a spindle integral with a hand grip is capable of being threaded through holes provided in the container parallel to the axis of articulation of the support, so that the support can be locked in either a retracted position when the front portion of the support passes above the spindle, or a lowered position when the spindle is threaded through a hole provided in the front portion of the support.

10. The loading mechanism as claimed in claim 1, wherein said tunnel housing of said container extends along a part of the length of said container bottom to form a tunnel.

* * * * *

UNITED STATES PATENT AND TRADEMARK OFFICE
CERTIFICATE OF CORRECTION

PATENT NO. : 4,132,325
DATED : January 2, 1979
INVENTOR(S) : Antoine Corompt

It is certified that error appears in the above-identified patent and that said Letters Patent are hereby corrected as shown below:

Column 2, line 56, after "6," insert the word ----is----.

Column 3, line 46, after the word "follows" delete ". Beginning" and insert ---- : beginning----.

Column 4, line 18, delete the word "cntainer" and insert the word ----container----.

Signed and Sealed this

Twenty-second Day of May 1979

[SEAL]

Attest:

RUTH C. MASON
Attesting Officer

DONALD W. BANNER
Commissioner of Patents and Trademarks